(12) United States Patent
Chang

(10) Patent No.: US 6,625,352 B2
(45) Date of Patent: Sep. 23, 2003

(54) OPTICAL COUPLING SYSTEM

(75) Inventor: Kok Wai Chang, Los Altos, CA (US)

(73) Assignee: JDS Uniphase Corporation, San Jose, CA (US)

( * ) Notice: Subject to any disclaimer, the term of this patent is extended or adjusted under 35 U.S.C. 154(b) by 131 days.

(21) Appl. No.: 09/818,908

(22) Filed: Mar. 28, 2001

(65) Prior Publication Data

US 2003/0161578 A1 Aug. 28, 2003

(51) Int. Cl.[7] .................................................. G02B 6/32
(52) U.S. Cl. ......................................................... 385/33
(58) Field of Search .............................. 385/33, 16–19, 385/20–22, 35, 42

(56) References Cited

U.S. PATENT DOCUMENTS

| | | | |
|---|---|---|---|
| 6,404,951 B2 * | 6/2002 | Danziger | 385/28 |
| 6,442,310 B1 * | 8/2002 | Wills | 385/33 |
| 6,483,961 B1 * | 11/2002 | Helkey et al. | 385/18 |
| 6,487,334 B2 * | 11/2002 | Ducellier et al. | 385/22 |

* cited by examiner

Primary Examiner—Khiem Nguyen
(74) Attorney, Agent, or Firm—Lacasse & Associates, LLC; Randy W. Lacasse

(57) ABSTRACT

An optical light coupling system is provided which includes an optical waveguide having a slanted end face, a lens for receiving a beam of light from the optical waveguide, wherein an optical axis of the lens defines a line extending through a center of the light guiding portion of the optical waveguide, and a powerless non-birefringent element disposed between the optical waveguide and the lens along the line defined between the optical axis of the lens and the center of the optical waveguide for maintaining a substantially linear propagation of the beam of light along the line, wherein the powerless non-birefringent element has a first end face facing an end face of said optical waveguide and defining an angle therebetween, and a second end face facing the lens. This angle can be adjusted to accommodate imperfect refractive index matches.

18 Claims, 4 Drawing Sheets

OPTICAL COUPLING SYSTEM

FIELD OF THE INVENTION

This invention relates to the field of optical coupling systems.

BACKGROUND OF THE INVENTION

One of the most common optical connections is between an optical fiber end and a collimating lens, such as spherical or aspherical lenses and/or graded index (GRIN) lenses. Grin lenses are produced under the trade name "SELFOC"; the mark is registered in Japan and owned by the Nippon Sheet and Glass Co. Ltd.

A common coupler system comprises a sleeve in which a fiber end within a supporting ferrule is joined to a lens by attaching the sides of the ferrule and the lens to the interior bore of the sleeve.

Another common practice is to couple an optical fiber to a lens by placing the optical fiber into a ferrule or fiber tube and joining an end face of the tube directly to a face of the lens by applying a layer of epoxy between them. A direct ferrule to lens epoxy connection facilitates alignment of the coupled elements and provides a uniform joint. However, epoxy is not completely transparent or uniform to transmission. Transmission of light though the epoxy layer results in some loss.

To couple an optical fiber end to an optical element, such as a lens, there are three positioning variables: the spacing between the elements, the coupling point relative to the optical axis, and the coupling angle. Common coupling techniques do not provide a convenient method of adjusting the spacing between the elements, or the coupling angle.

It is often desired to make a coupling with a precise predetermined distance between elements, which is not possible with a direct epoxy connection. Typically this is accomplished by fixing the elements with the desired separation between them on a substrate with adhesive. It is difficult to establish an exact separation, or alignment and angular positioning by this method.

Substantial coupling losses may occur between a fiber end and a collimating lens when the distance or gap between these elements is significant. This is particularly the case for long working distance collimators having increased focal lengths. It is one aspect of this invention to reduce this unwanted coupling loss. In addition to a controlled coupler spacing, a correct coupling angle is critical in some configurations for a low loss coupling. A gap between the fiber end and the collimating lens causes a beam of light propagating from the fiber end to the collimating lens to be shifted downwards or upwards depending on the slant of the fiber facet. Hence, in order to achieve an efficient coupling between the fiber and the lens, it is known to provide the fiber at an appropriate angle with respect to the optical axis of the lens. However, this increases the package size for such a coupling system.

It is desired to provide a coupling system which provides a reliable means for coupling between optical elements. It is further desired to provide a coupling system which is unimpeded by transmission through an epoxy layer.

It is an object of this invention to provide an optical coupling system having an in-line or coaxial arrangement between an optical axis of a collimating lens and a center of a waveguide.

Another object of this invention is to provide an optical coupling arrangement with low coupling losses and a small coupler package size.

SUMMARY OF THE INVENTION

In accordance with the invention there is provided, an optical light coupling system comprising: an optical waveguide having a slanted end face; a lens for receiving a beam of light from the optical waveguide, wherein an optical axis of the lens defines a line extending through a center of a light guiding portion of the optical waveguide; and a powerless non-birefringent element disposed between the optical waveguide and the lens along the line defined between the optical axis of the lens and the center of the light guiding portion of the optical waveguide for maintaining a substantially linear propagation of the beam of light along the line, wherein the powerless non-birefringent element has a first end face facing an end face of said optical waveguide and defining an angle therebetween, and a second end face facing the lens.

In accordance with the invention, there is further provided, an optical coupling arrangement comprising: an optical fiber having a slanted end face; a lens for receiving a beam of light from the optical fiber, the lens and the slanted end face of the optical fiber being in a spaced relationship along a line defined between an optical axis of the lens and a center of a core of the optical fiber such that the slanted end face of the optical fiber is disposed in the focal plane of the lens; and a powerless non-birefringent optical element being optically coupled with the optical fiber and the lens and disposed therebetween for ensuring that a center of the beam substantially follows the line, the element having a first and a second end face, the first end face facing the slanted end face of the optical fiber, the first end face and the slanted end face of the optical fiber defining an angle therebetween, and the second end face facing the lens.

The invention further provides an optical light coupling system comprising: an optical fiber having a core and a slanted end face; a collimating lens for receiving a beam of light from the optical fiber; and a light transmissive element disposed between said optical fiber and the collimating lens, said light transmissive element having a substantially same refractive index as the core of the fiber for maintaining a substantially linear propagation of the beam of light, said light transmissive element having a first end face for mating with the optical fiber and being complementary thereto and a second end face for coupling with the lens, said light transmissive element, said collimating lens, and said optical fiber are co-axial.

BRIEF DESCRIPTION OF THE DRAWINGS

Exemplary embodiments of the invention will now be described in conjunction with the drawings in which.

DETAILED DESCRIPTION OF EXEMPLARY EMBODIMENTS

Figure 1:
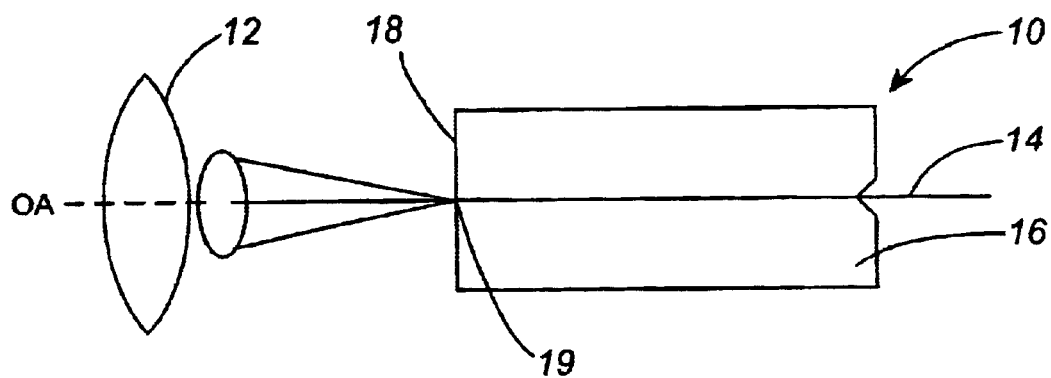
FIG. 1 is a schematic side view of a prior art optical coupling arrangement including a collimating lens and a fiber end disposed at a spaced relationship from the collimating lens.

Turning now to FIG. 1 a prior art optical coupling arrangement 10 is shown including a collimating lens 12 having an optical axis OA and a fiber end 14 having a planar coupling end face 19 and being supported by a ferrule 16. An end face 18 of the ferrule 16 and end face 19 of fiber 14 are coplanar and perpendicular to the center of fiber 14. As is seen from FIG. 1 a beam of light emerges from end face 19 of fiber 14 in a diverging ring at approximately the same angle θ to the fiber axis as it had when it entered fiber 14. The ring of angles of the emergent beam is centered on θ, commonly 6° for a single mode fiber. Furthermore, the beam of light encounters back-reflection at end face 19 of fiber end 14. In order to reduce this back-reflection an anti-reflection coating is provided on end face 19. The anti-reflection coating commonly reduces a transmission loss from about 4% to about 0.1% which corresponds to ca. −30 dB. However, the return loss remains high if end face 19 is perpendicular to the center of fiber 14.

Figure 2:
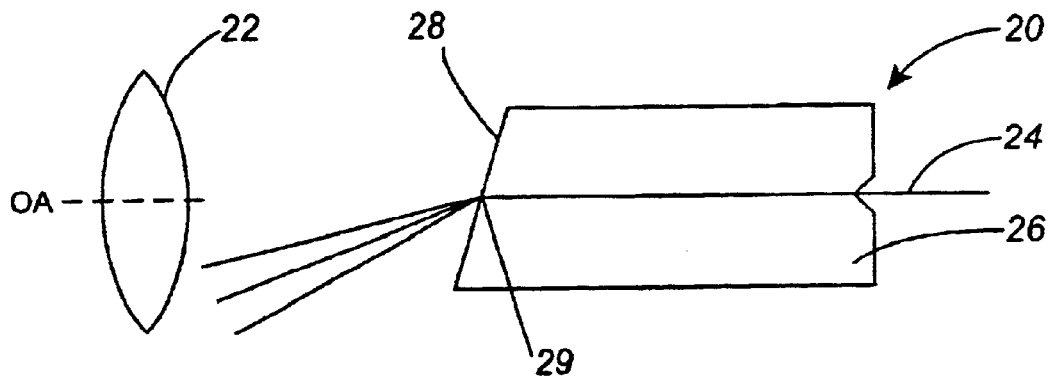
FIG. 2 is a schematic side view of another prior art optical coupling system wherein an end face of the fiber has a slant to lessen the effect of unwanted back reflections.

FIG. 2 shows another prior art optical coupling system 20 including a collimating lens 22 and a fiber end 24 supported by a ferrule 26. Both, an end face 28 of ferrule 26 and an end face 29 of fiber 24 are coplanar and provided with a slant to reduce both, the transmission loss and the return loss. The provision of a slanted end face reduces the transmission and return loss to approximately −50 to −60 dB. However, the slant causes the beam of light to be directed in a downwards direction, as shown in FIG. 2, and the light does not couple with the center of lens 22. As a result, coupling losses to lens 22 and aberrations of the lens 22 prevent an efficient coupling from fiber 24 to lens 22.

Figure 3:
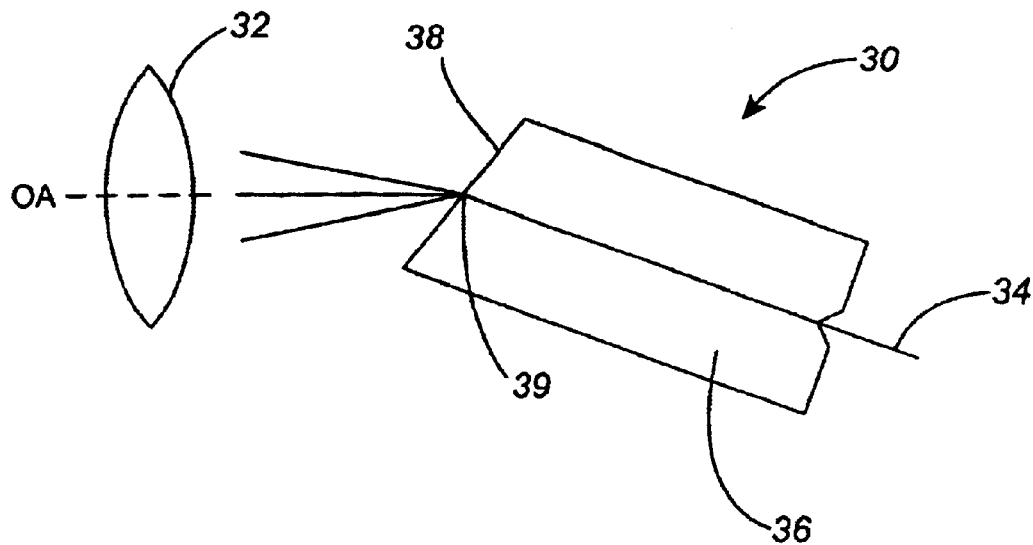
FIG. 3 is a schematic side view of another prior art coupling system wherein the collimating lens and the fiber are not co-linear.

FIG. 3 shows another prior art coupling system 30 including a collimating lens 32 and a fiber end 34 supported in a sleeve 36. As is seen from FIG. 3, fiber 34 in ferrule 36 are tilted so that the beam of light can couple into a central portion of lens 32 when the beam of light exits from end face 39 in a downwards direction. Such a coupling arrangement reduces the amount of transmission and return losses while still maintaining an efficient coupling. However, the tilt of fiber 34 and ferrule 36 with respect t the optical axis of lens 32 results in an increased package size of optical coupling system 30.

Figure 4:
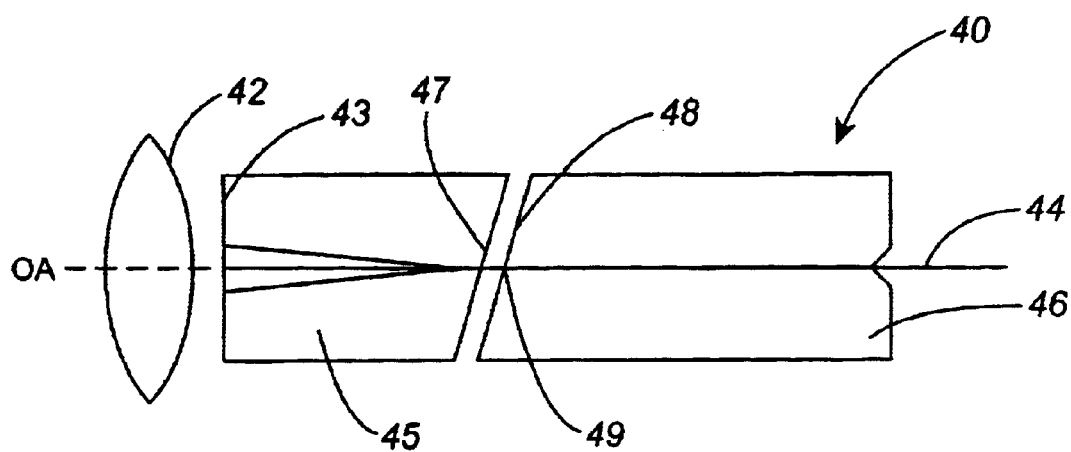
FIG. 4 is a schematic side view of an optical coupling arrangement in accordance with an embodiment of the present invention including a powerless non-birefringent optical element.

FIG. 4 shows an optical coupling arrangement 40 in accordance with an embodiment of the present invention reducing the effect of undesired back reflection and providing efficient coupling with a reduced package size. Optical coupling arrangement 40 includes a collimating lens 42, a fiber end 44 supported in a fiber tube or ferrule 46, and a powerless non-birefringent optical element 45, such as a block of glass or plastic. Optical element 45 is disposed between the lens 42 and fiber 44 along a line extending from the optical axis of the lens through the center of the fiber 44. Optical element 45 has a first end face 47 facing the coplanar end faces 48 and 49 of the ferrule 46 and the fiber 44, respectively, and a second end face 43 facing the lens 42. End face 47 is complementary and parallel to the coplanar end faces 48 and 49. By placing optical element 45 between the fiber and the lens, the beam of light continues to propagate along the line extending from the center of the fiber 44 through the optical axis of the lens rather then exiting in a downward direction. The path of the beam of light through optical element 45 is determined by the slant angle of end face 47 and the refractive index of the material of optical element 45. In accordance with an embodiment of the invention, the fiber has a slant of 8–10°. If end faces 47 and 48/49 are parallel, the material and hence the respective refractive index of optical element 45 is chosen so as to substantially match the refractive index of a core, i.e. the light guiding portion, of fiber 44 so that the beam of light propagates substantially straight through optical element 45 rather than being directed in a downward direction. Thus, if end faces 47, 48 and 49 are parallel, and if the refractive index of the fiber core and optical element 45 are substantially the same, the beam of light travels along a substantially straight line extending from the center of the fiber 44 through optical element 45 to the optical axis of lens 42. The term "substantially" is used to indicate that there is a small deviation from a straight line as the beam of light passes through the interface between fiber 44 and optical element 45 as shown in FIG. 4.

However, if the refractive index of the fiber core or the light guiding portion of a waveguide is not matched perfectly by optical element 45 but similar, the angle defined between end faces 47 and 48/49 can be adjusted to accommodate imperfect refractive index matches. This is done in accordance with Snell's law as shown in more detail in conjunction with FIG. 5.

Figure 5:
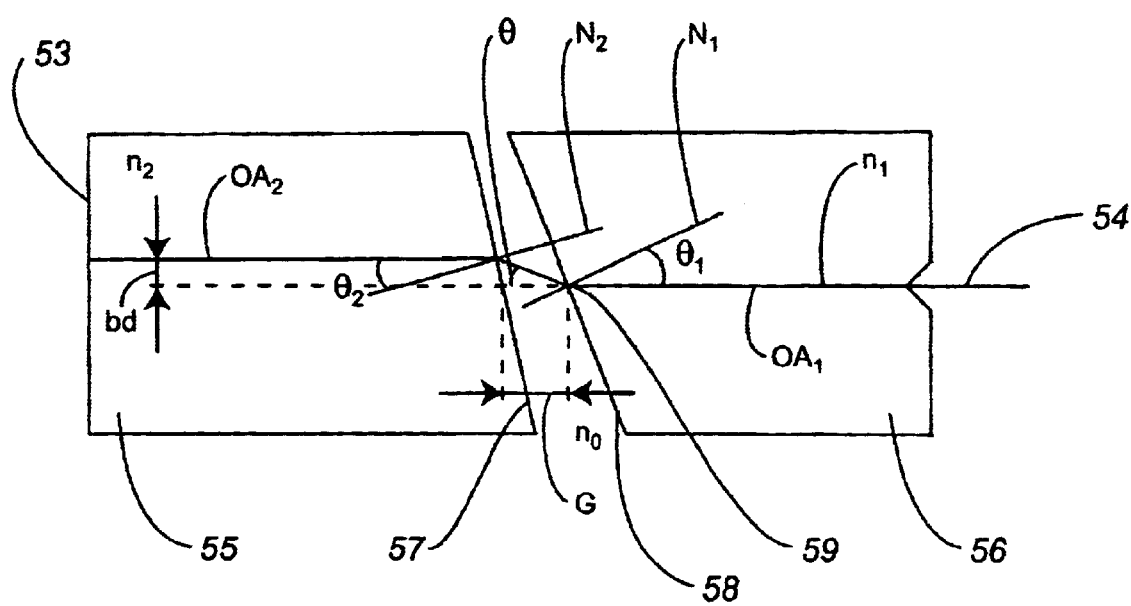
FIG. 5 is a schematic side view to demonstrate how an angle defined between an end face of the powerless non-birefringent element and a slanted end face of the waveguide are adjusted to accommodate imperfect refractive index matches in accordance with Snell's law.

As shown in FIG. 5, a fiber end 54 is supported by a fiber tube or sleeve 56. The sleeve has an end face 58 and the fiber has an end face 59. Both end faces, 58 and 59, are coplanar. A beam of light travelling through fiber 54 couples into a powerless non-birefringent optical element 55 via end face 57 and continues to travel therethrough on a substantially straight line. As is seen from FIG. 5, end face 57 is not parallel to co-planar end faces 58 and 59 in order to compensate for a difference in refractive indices between the refractive index of optical element 55 and the refractive index of the core of fiber 54. The slant of end faces 57 and 59 is determined in accordance with Snell's law as shown in FIG. 5 and explained in more detail below.

The angles of incidence and refraction are measured not from the plane of the surface but from a line $N_1$ and $N_2$ normal or perpendicular to the respective end face 59 and 57. This relationship is known as Snell's law and is written $$n_1 \sin \theta_1 = n_0 \sin(\theta_1 + \phi)$$

$$n_2 \sin \theta_2 = n_0 \sin(\theta_2 + \phi)$$

where $n_0$ is the refractive index of air, $n_1$ is the refractive index of the core of fiber 54, $n_2$ is the refractive index of optical element 55, $\theta_1$ is the polish angle of fiber end face 59, $\theta_2$ is the polish angle of optical element 55, and $\phi$ is a tilt angle between end faces 57 and 59.

Further, the following expression is used to determine a distance Δd between an optical axis $OA_1$ of fiber 54 and an optical axis $OA_2$ of optical element 55, and a gap G between fiber end face 59 and end face 57 of optical element 55

$$\Delta d \approx G \tan \phi$$

However, it is advantageous to keep the gap between the powerless non-birefringent optical element and the fiber in the sleeve small. Thus, it is advantageous to substantially match the refractive index of the powerless non-birefringent optical element with the core of the fiber, as the gap between these elements increases if the tilt angle φ defined between their mating end faces is adjusted to compensate for differences in refractive indices.

If desired, an anti-reflective (AR) coating is applied to end faces of the powerless non-birefringent optical element and the fiber in order to minimize a transmission loss at interfaces between the powerless and non-birefringent optical element and the fiber. In accordance with a further embodiment of the invention, the end faces of the powerless non-birefringent optical element and the fiber are polished to reduce the effect of a return loss.

The optical coupling system in accordance with the present invention is primarily designed for optical fibers. If desired, however, the invention is practiced with any kind of waveguide.

FIGS. 1–4 show a spherical bi-convex lens as the collimating lens. However, other collimating lenses are used if desired, such as GRIN lenses. The use of aspherical lenses is advantageous for aberration corrections.

Figure 6:
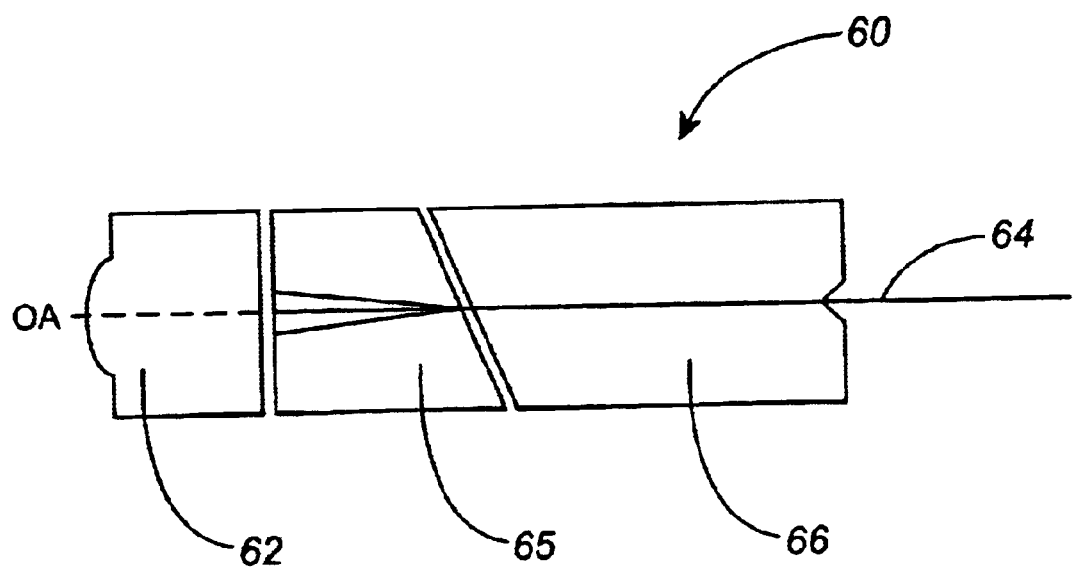
FIG. 6 is a schematic side view of an optical coupling arrangement including an aspherical lens.

FIG. 6 shows an optical coupling arrangement 60 in accordance with the invention including an aspherical lens 62, a fiber end 64 supported in a ferrule 66, and a powerless non-birefringent optical element 65. Optical element 65 is disposed between the aspherical lens 62 and fiber 64 along a line extending from the optical axis OA of the aspherical lens 62 through the center of the fiber 64. If desired, optical element 65 is injection molded to fit any type of lens, such as an aspherical lens.

Figure 7:
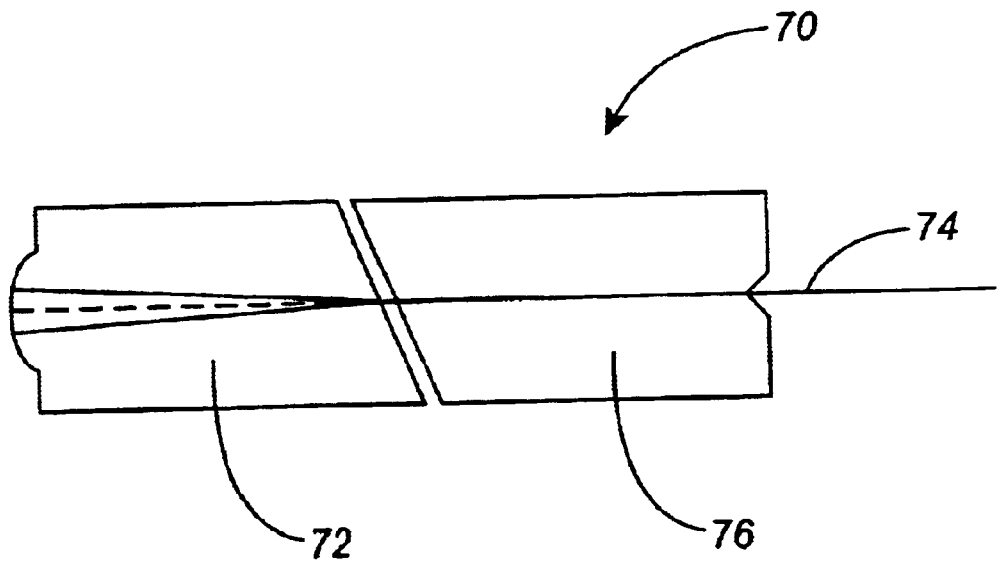
FIG. 7 is a schematic view of another coupling arrangement in accordance with the invention wherein the lens and the powerless non-birefringent element are integral.

FIG. 7 shows an optical coupling system 70 in accordance with another embodiment of the invention wherein the powerless and non-birefringent optical element and an aspherical lens form an integral optical element 72. If desired, the aspherical lens is injection molded with a respective angle to satisfy Snell's law so that it is fitted directly to a fiber end 74 supported in a sleeve 76. In this embodiment, the lens fulfills the function of the lens as well as of the powerless non-birefringent optical element. The material of optical element 72 is a high index material, having a refractive index of approximately 1.8 to 2, for example.

The optical coupling arrangement in accordance with the present invention is particularly useful when operating with lenses having a long focal length, for example focal lengths of 10–15 mm, which requires an increase in the distance between the lens and the fiber end as the fiber end is positioned in the focal plane of the lens. It is noted, that the focal length of the lens is affected by placing the powerless non-birefringent optical element between the lens and the fiber end. This has to be taken into consideration when determining the focal plane of the lens.

Furthermore, when using GRIN lenses less than ¼ pitch, the fiber end is positioned away from the lens, in a plane corresponding to the focal plane of the lens. In accordance with an embodiment of the present invention, a powerless non-birefringent optical element is employed to fill the gap between the lens and the fiber end to maintain a linear propagation of the beam of light and to avoid undesired back-reflections at the interfaces. However, when using a ¼ pitch GRIN lens, the focal plane of the lens is located at an end face of the lens and the fiber end is coupled directly to the end face.

In accordance with the present invention, the space between the lens and the fiber end is filled with the powerless non-birefringent element to prevent the beam of light travelling from the fiber end to the lens from being directed in a downwards direction so that it couples with the center of the lens and to reduce undesired back-reflections. As a result, the optical coupling arrangement in accordance with the present invention yields better collimation than prior art linear optical coupling arrangements since the beam of light couples with a central portion of the lens.

Preferred materials for the manufacture of the powerless non-birefringent element are BK 7™ having a refractive index of n=1.52, SF 11™ having a refractive index of 1.78, and fused silica having a refractive index of n=1.46. If desired, other materials that are index matching or have a similar refractive index as the light guiding portion of the optical waveguide are employed.

Numerous other embodiments can be envisaged without departing from the spirit and scope of the invention.

What is claimed is:

1. An optical light coupling system comprising:
an optical waveguide having a slanted end face;
a lens for receiving a beam of light from the optical waveguide, wherein an optical axis of the lens defines a line extending through a center of a light guiding portion of the optical waveguide; and
a powerless non-birefringent element disposed between the optical waveguide and the lens along the line defined between the optical axis of the lens and the center of the light guiding portion of the optical waveguide for maintaining a substantially linear propagation of the beam of light along the line, wherein the powerless non-birefringent element has a first end face facing an end face of said optical waveguide and defining an angle therebetween, and a second end face facing the lens.

2. The optical coupling system as defined in claim 1 wherein a length of the powerless non-birefringent element is such that the element fills a space between the lens and the focal plane of the lens.

3. The optical coupling system as defined in claim 2 wherein the slanted end face of the optical waveguide intersects the focal plane of the lens.

4. The optical coupling system as defined in claim 3 wherein a refractive index of the element is a substantially same refractive index as a refractive index of the light guiding portion of the waveguide.

5. The optical coupling system as defined in claim 4 wherein the first end face of the element and the slanted end face of the optical waveguide are substantially parallel.

6. The optical coupling system as defined in claim 3 wherein a refractive index of the element is similar to a refractive index of the light guiding portion of the optical waveguide.

7. The optical coupling system as defined in claim 6 wherein the first end face of the element and the slanted end face of the optical waveguide are non-parallel and the angle defined therebetween is non-zero.

8. The optical coupling system as defined in claim 3 wherein the slanted end face of the optical waveguide has a slant of 8–10°.

9. The optical coupling system as defined in claim 3 wherein the second end face of the element has a profile complementary to a face of the lens.

10. The optical coupling system as defined in claim 1 wherein the lens is one of a spherical lens and an aspherical lens.

11. The optical coupling system as defined in claim 3 further including an antireflective coating provided on said end face of the optical waveguide for lessening an effect of undesired back-reflection.

12. The optical coupling system as defined in claim 2 wherein a material of the element is chosen from the group consisting of glass, plastic, silica based glasses, quartz, BK7, and SF 11.

13. The optical coupling system as defined in claim 10 wherein the element and the aspherical lens are integral.

14. An optical coupling arrangement comprising:

an optical fiber having a slanted end face;

a lens for receiving a beam of light from the optical fiber, the lens and the slanted end face of the optical fiber being in a spaced relationship along a line defined between an optical axis of the lens and a center of a core of the optical fiber such that the slanted end face of the optical fiber is disposed in the focal plane of the lens; and a powerless non-birefringent optical element being optically coupled with the optical fiber and the lens and disposed therebetween for ensuring that a center of the beam substantially follows the line, the element having a first and a second end face, the first end face facing the slanted end face of the optical fiber, the first end face and the slanted end face of the optical fiber defining an angle therebetween, and the second end face facing the lens.

15. The optical coupling arrangement as defined in claim 14 further including a fiber tube for containing and aligning the optical fiber, said fiber tube having a slanted end face for matching the slanted end face of the optical fiber.

16. The optical coupling arrangement as defined in claim 15 wherein the slanted end face of the optical fiber and the fiber tube have a slant of 8–10°.

17. The optical coupling arrangement as defined in claim 14 wherein the second end face and the lens have complementary faces.

18. An optical light coupling system comprising:

an optical fiber having a core and a slanted end face;

a collimating lens for receiving a beam of light from the optical fiber; and a light transmissive element disposed between said optical fiber and the collimating lens, said light transmissive element having a substantially same refractive index as the core of the fiber for maintaining a substantially linear propagation of the beam of light, said light transmissive element having a first end face for mating with the optical fiber and being complementary thereto and a second end face for coupling with the lens, said light transmissive element, said collimating lens, and said optical fiber are co-axial.

* * * * *